INVENTOR
Carl A. Helm
by Wolfe, Hubbard, Voit & Osann
ATTORNEYS

Feb. 6, 1968 C. A. HELM 3,368,108
DIGITAL SYNCHRONIZING AND PHASE MATCHING SYSTEM
Filed Feb. 1, 1966 11 Sheets-Sheet 2
FIG. 2 (SPEEDS EQUAL)
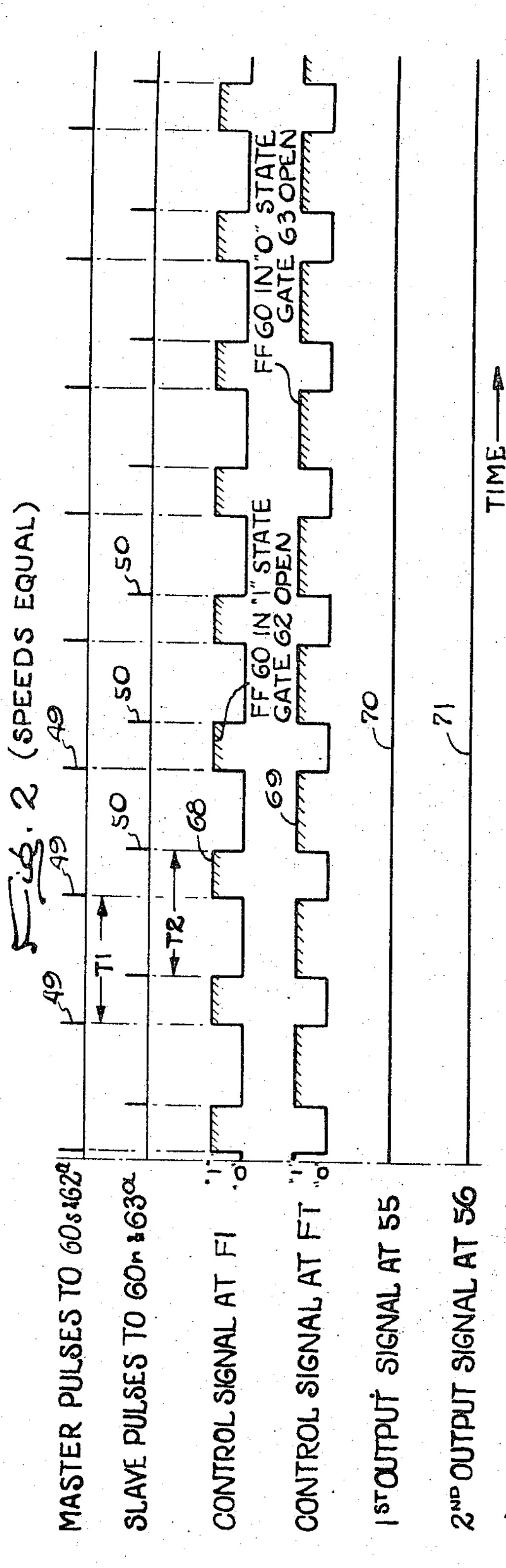
FIG. 3 (SLAVE FAST)
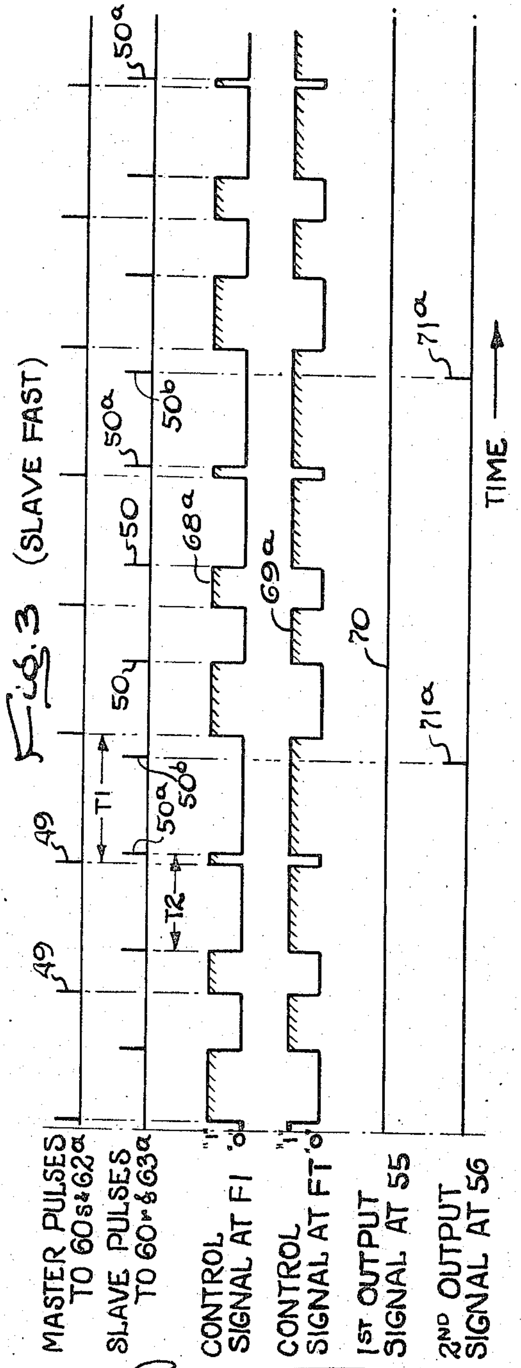
INVENTOR
Carl A. Helm
by Wolfe, Hubbard, Voit & Osann
ATTORNEY

DIGITAL SYNCHRONIZING AND PHASE MATCHING SYSTEM

Filed Feb. 1, 1966 11 Sheets-Sheet 3

INVENTOR
Carl A. Helm
by Wolfe, Hubbard, Voit & Osann
ATTORNEYS

INVENTOR
Carl A. Helm
by Wolfe, Hubbard, Voit & Osann
ATTORNEYS

INVENTOR
Carl A. Helm
by Wolfe, Hubbard, Voit & Osann
ATTORNEYS

INVENTOR
Carl A. Helm
By Wolfe, Hubbard, Voit & Osann
ATTORNEYS

Feb. 6, 1968 C. A. HELM 3,368,108

DIGITAL SYNCHRONIZING AND PHASE MATCHING SYSTEM

Filed Feb. 1, 1966 11 Sheets-Sheet 7

INVENTOR
Carl A. Helm
by Wolfe, Hubbard, Voit & Osann
ATTORNEYS

INVENTOR
Carl A. Helm
by Wolfe, Hubbard, Voit & Osann
ATTORNEYS

INVENTOR
Carl A. Helm
by Wolfe, Hubbard, Voit & Osann
ATTORNEYS

Feb. 6, 1968 C. A. HELM 3,368,108

DIGITAL SYNCHRONIZING AND PHASE MATCHING SYSTEM

Filed Feb. 1, 1966 11 Sheets-Sheet 10

INVENTOR
Carl A. Helm
by Wolfe, Hubbard, Voit & Osann
ATTORNEYS

DIGITAL SYNCHRONIZING AND PHASE MATCHING SYSTEM

Filed Feb. 1, 1966

INVENTOR
Carl A. Helm
by Wolfe, Hubbard, Voit & Osann
ATTORNEYS

3,368,108
DIGITAL SYNCHRONIZING AND PHASE MATCHING SYSTEM

Carl A. Helm, Rockford, Ill., assignor to Woodward Governor Company, Rockford, Ill., a corporation of Illinois Filed Feb. 1, 1966, Ser. No. 524,260
11 Claims. (Cl. 317—6)

The present invention relates in general to systems for synchronizing two recurring events such as the frequencies of two repeating signal trains or the continuous rotations of two shafts. The invention also pertains to systems for maintaining the two recurring events, such as two repeating signal trains or shaft speeds, in constant phase relation or phase match.

More particularly, the invention has to do with improvements in synchronizing and phase matching systems of the type disclosed and claimed in the copending application of James L. Leeson, Jr., Ser. No. 524,315, filed of even date and assigned to the same assignee as that of the present application.

It is the primary aim of the present invention to render the operation of synchronizing and phase matching systems of the genus disclosed and claimed in the above-identified copending Leeson application more precise, reliable and consistent in their operation, and in a manner which requires the addition of only a few simple digital signal handling components to the basic system apparatus.

More specifically, it is an object of the present invention to do away with the indecisiveness and inaccuracies of response which may occur when two input signals to a digital synchronizing system occur substantially in time coincidence, and by making the system always ignore time coincident input signals.

Another object of the present invention is to make possible a digital phase matching system in which over-correction of small phase errors and hunting is avoided by means which create a deadband in the response so as to prevent corrective action whenever the phase error is less than a predetermined magnitude.

Other objects and advantages will become apparent as the following description proceeds, taken in conjunction with the accompanying drawings, in which:

FIG. 2 is a timing diagram for various signals which occur in the apparatus of FIG. 1 when the speeds of the master and slave engines are equal;

FIG. 3 is a similar timing diagram showing the same signals whenever the slave engine is running faster than the master engine;

FIG. 5 is a block-and-line diagram substantially identical to FIG. 1, but showing the additional components (drawn in heavier lines) which are employed for the purpose of eliminating the effects of "jitter" due to torsional vibrations or the like;

Figure 5:
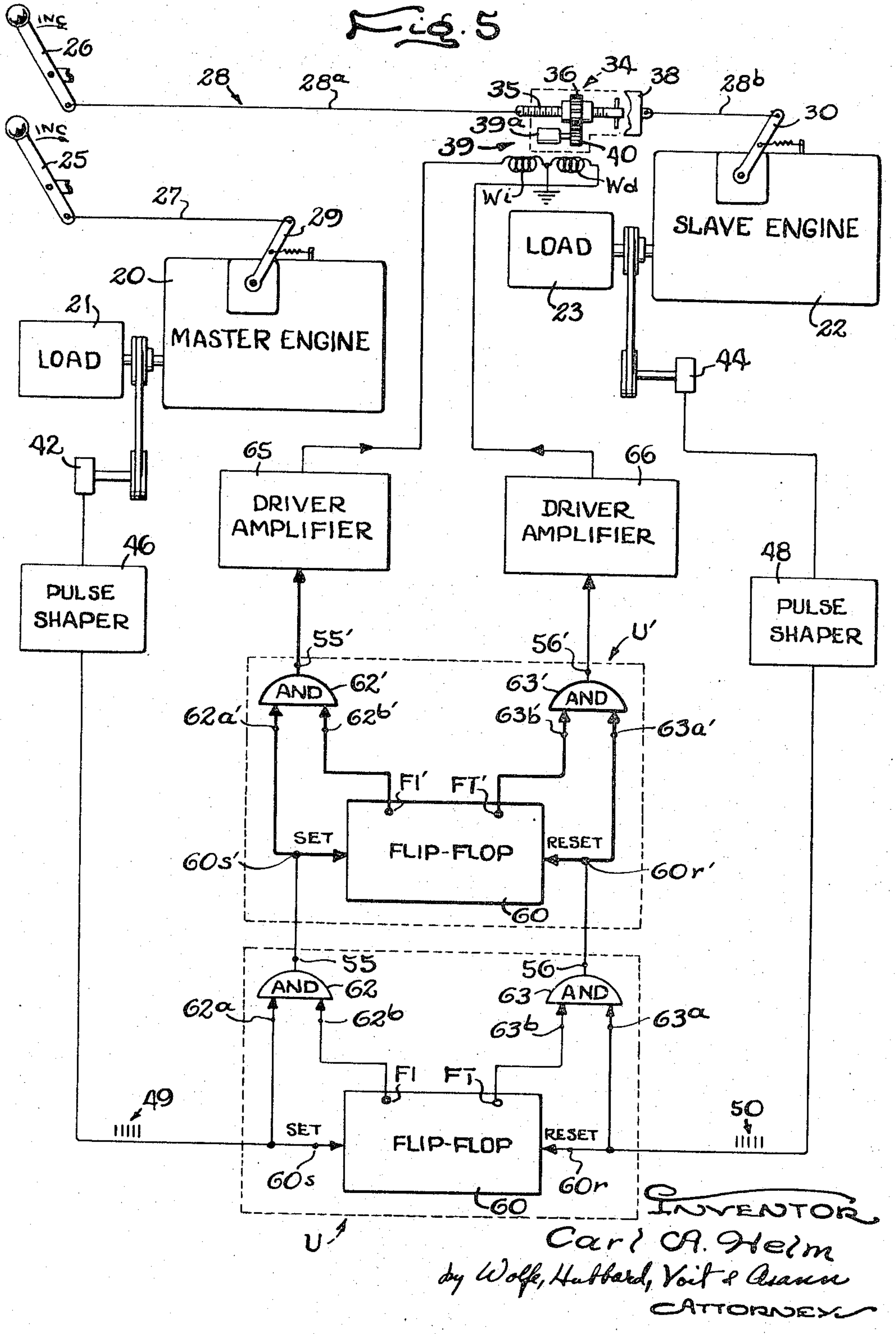
Figure 8A:
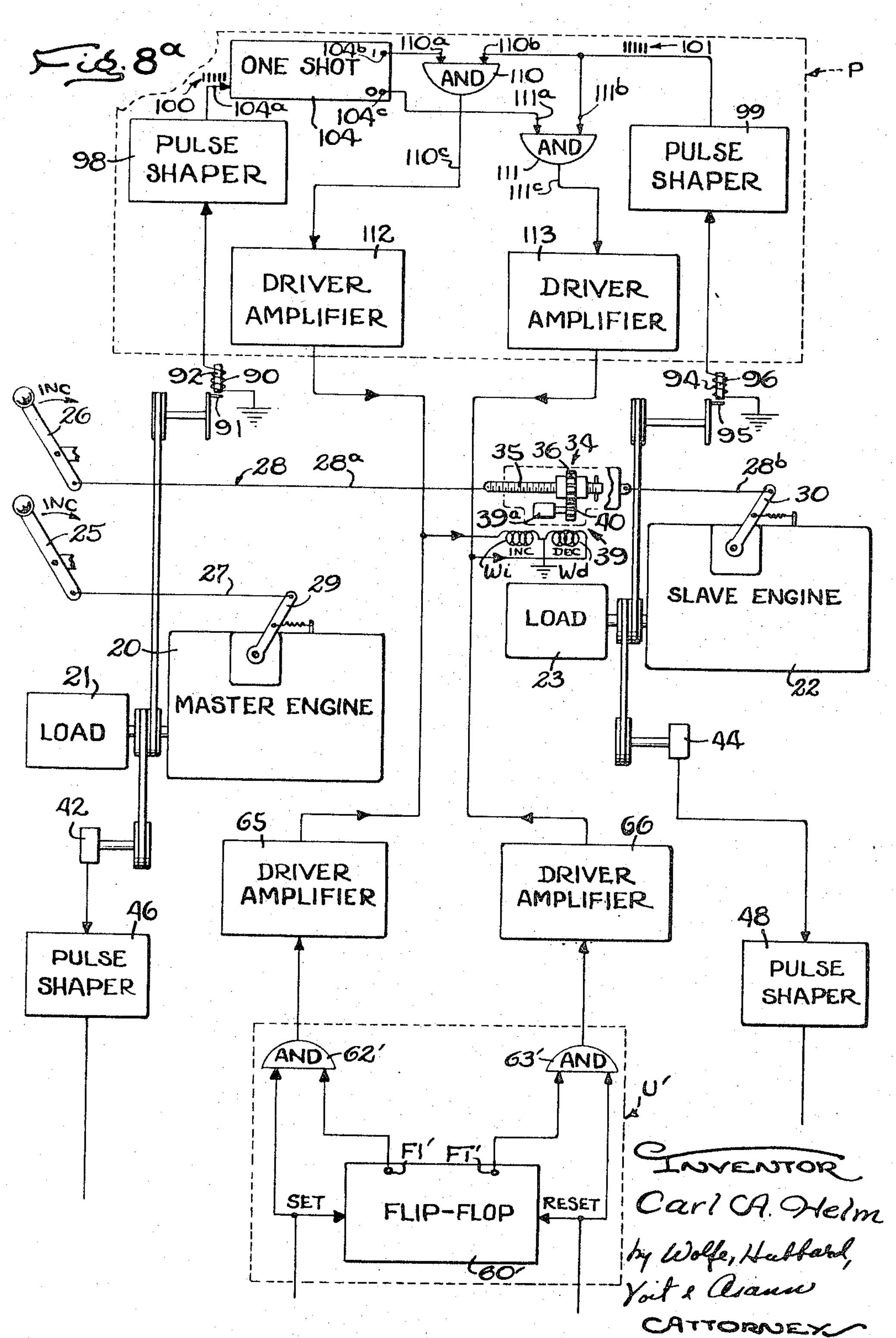
Figure 8B:
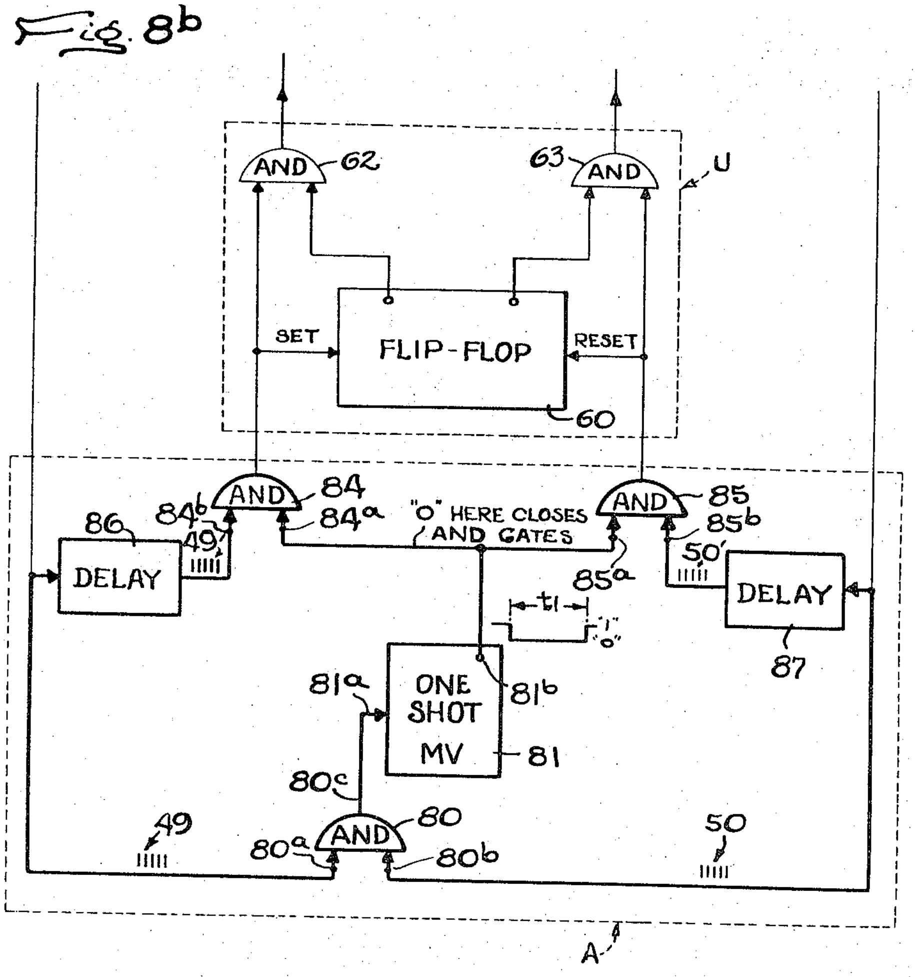
Figure 9:
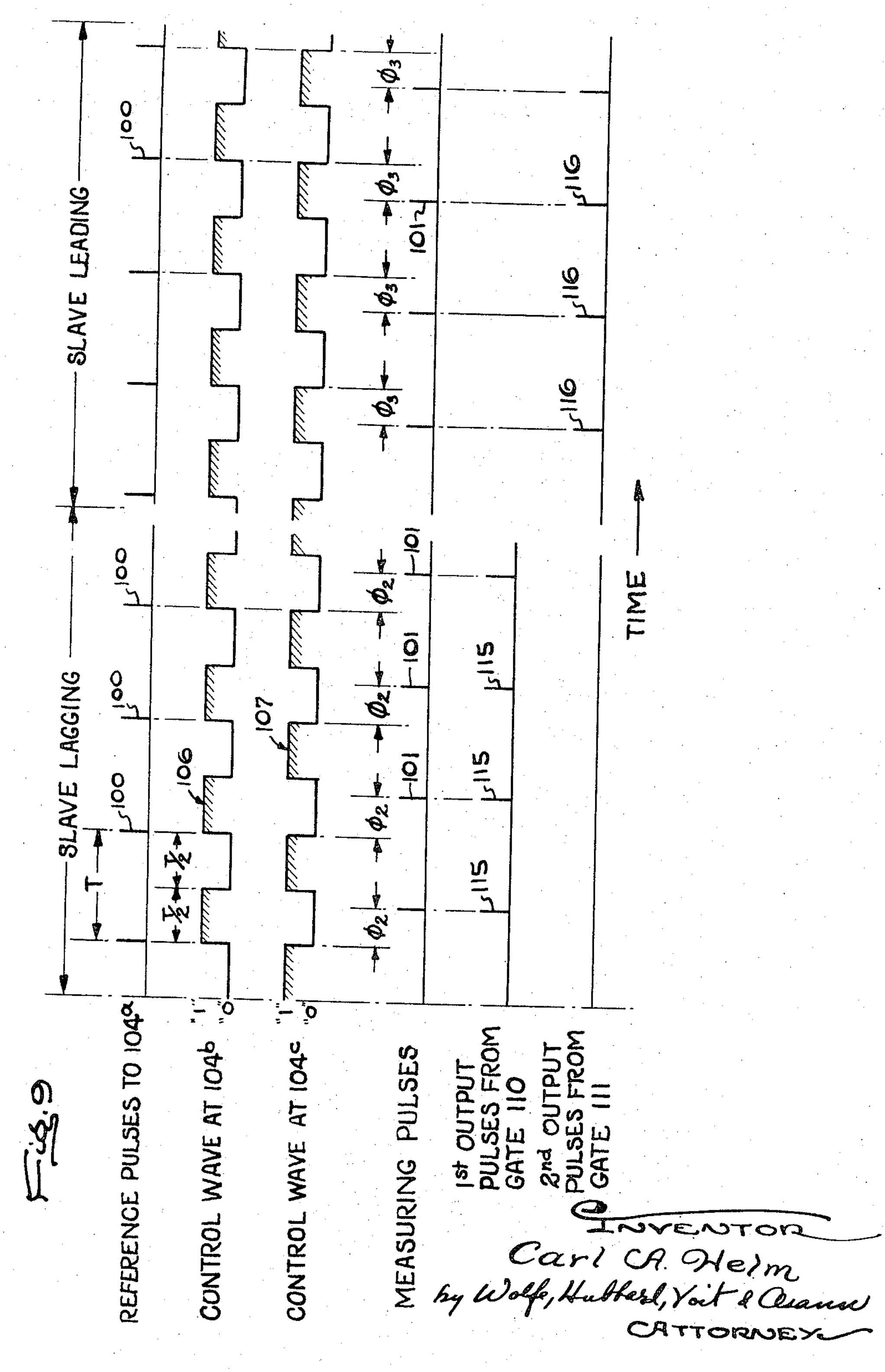
Figure 10:
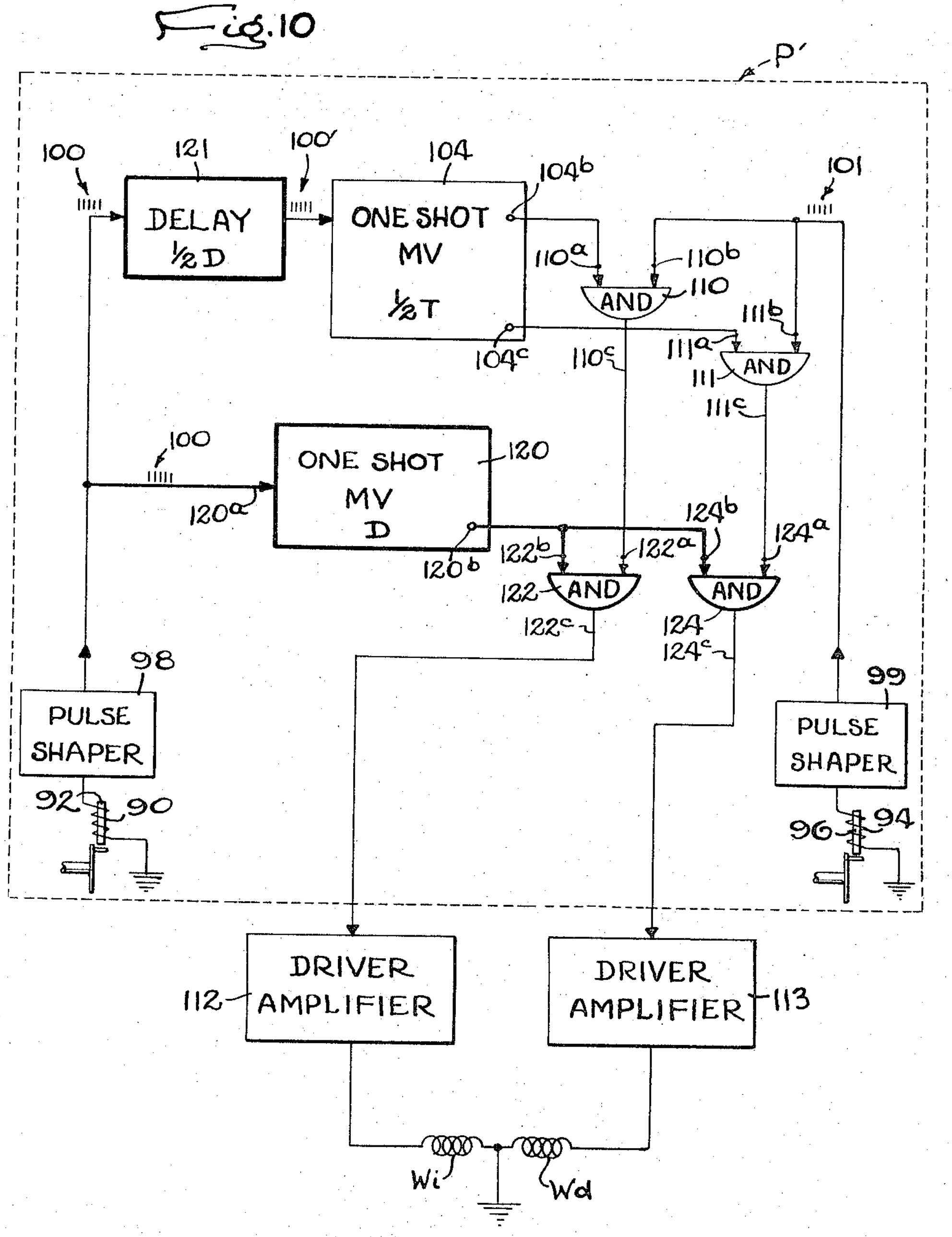
Figure 11:
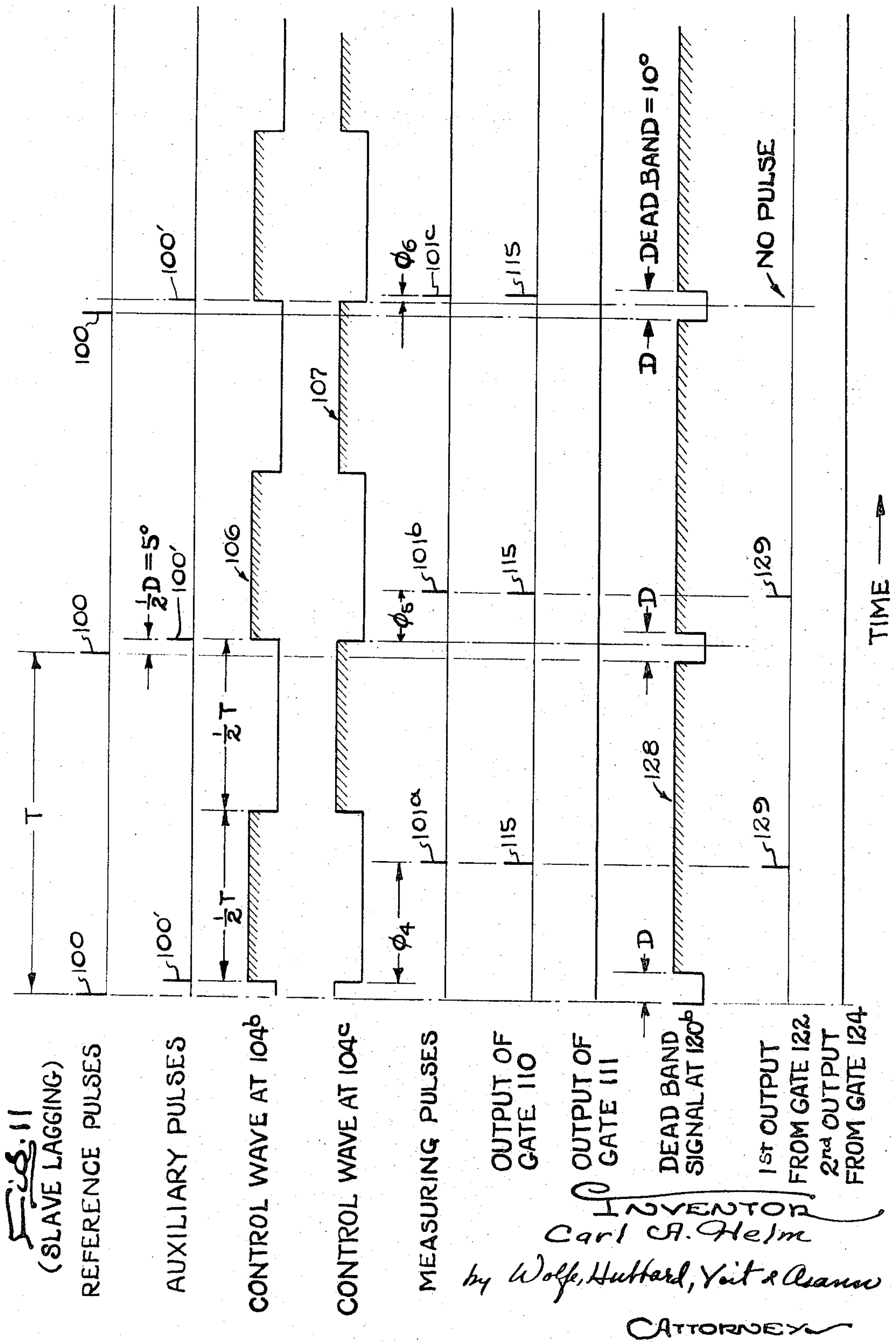

FIGS. 8*a* and 8*b* when joined together are a block diagram similar to FIG. 5 but further illustrate (by those portions drawn in heavy lines) anti-coincidence apparatus and an auotomatic phase matching system;

FIG. 9 is a timing diagram showing the relationships of signals which occur in the phase matching system of FIG. 8*a* during the operation of the latter;

FIG. 10 is a block-and-line diagram showing improvements in the phase matching system illustrated in FIGS. 8*a* and 8*b*, such improvements embodying the present invention and providing a deadband in the corrective response to phase errors; and FIG. 11 is a timing diagram illustrating the relationship of signals occuring in the apparatus of FIG. 10 during operation thereof, and particularly indicating how the deadband response is obtained.

Figure 1:
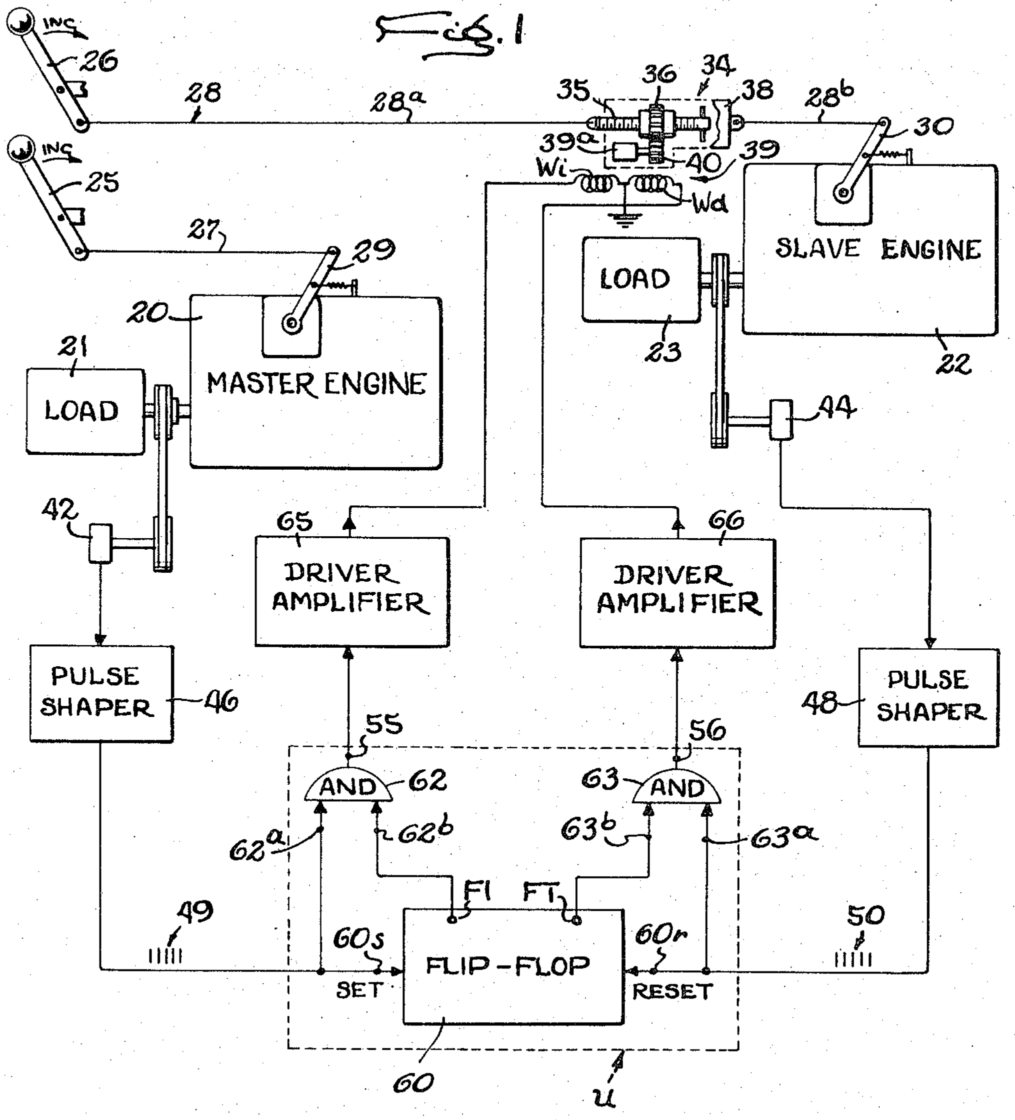
FIGURE 1 is a block-and-line diagram of a digital synchronizing system shown in the environment of controlling the speed of a slave engine to keep it equal to that of a master engine.

Referring now to FIG. 1, a synchronizing system embodying the present invention is there shown for bringing the speeds of two rotating prime movers into synchronism and maintaining them equal. The prime movers are diagrammatically illustrated as a master engine 20 driving a master load 21 and a slave engine 22 driving its load 23. Hand throttle levers 25, 26 are coupled by flexible wire cables 27, 28 to the speed setting arms 29, 30 of governors (not shown in detail) for the two respective engines 20 and 22. Manual adjustment of the levers 25, 26, either individually or in unison, serves to shift the arms 29, 30 in directions to increase or decrease the speeds of the engines 20, 22 for example by opening or closing the fuel throttles (not shown).

The position of the speed-controlling arm 30 for the slave engine 22 can be adjusted, and the fuel input to the slave engine changed, independently of the setting of the slave control lever 26. Preferably, this is accomplished by pulse responsive means which serve to move the arm 30 in small steps either in a speed increasing or decreasing direction. As here shown, the cable 28 connected between the lever 26 and the arm 30 includes two portions 28*a*, 28*b* with a lengthwise expandable or contractible link 34 interposed therebetween. The link includes a screw 35 (held against bodily rotation by means not shown) joined to the cable portion 28*a* and engaged by a nut 36 rotatable in a casing 38 joined to the cable portion 28*b*. The casing contains a bi-directional stepping motor 39 having its armature 39*a* connected to a pinion 40 meshed with external gear teeth on the nut 36. The details of such a stepping motor are familiar to those skilled in the art, and it will suffice to observe here that the motor includes forward and reverse windings W*i* and W*d* which, in response to each voltage or current pulse applied thereto, causes the armature 39*a* to step in a forward or reverse direction. It will be assumed for purposes of discussion herein that pulses applied to the winding W*i* cause the motor 39 to step the nut 36 in a direction to contract the lead screw 35 into the casing 38, thus causing the cable portion 28*b* to swing the arm 30 in a direction to increase the speed of the slave engine 22. Conversely, pulses applied to the motor winding W*d* causes the link 34 to expand lengthwise, so that the bias spring associated with the arm 30 causes the latter to move in a speed decreasing direction. Therefore, the motor windings W*i* and W*d* may conveniently be called the slave speed increasing or decreasing windings, respectively.

In order to produce first and second trains of recurring discrete signals which are respectively proportional in their frequencies to the speeds of the master and slave engines 20 and 22, electrical signal generators 42 and 44 are connected, as shown, to be driven by the respective engine shafts. In actual practice each generator may, of course, be driven from any auxiliary shaft of the engine which rotates in timed relation to the output shaft, and the generator is preferably arranged so that it produces about forty cycles per revolution of the output shaft. In the specific form here illustrated, the signal generators 42 and 44 may be permanent magnet alternators which produce sinusoidal voltages having frequencies proportional to the speeds of their associated driving shafts. The sinusoidal output voltages are passed through pulse shapers 46 nd 48 in order to produce first and second trains of sharp, recurring pulses having repetition rates or frequencies respectively proportional to the speeds of the master and slave engines. Such pulses shown at 49 and 50 will be called the master and slave pulses, respectively. They are applied as the input signals to a synchronizing unit U to be described below.

*The synchronizing logic unit*

The basic synchronizing unit shown in FIG. 1 is like that disclosed and claimed in the aforementioned copending Leeson application. It will be described here in order that the background environment of the present invention will be clear. In general, that basic synchronizing unit includes means to produce a first type of output signal or a second type of output signal in response respectively to (*a*) the occurrence of two master pulses without an intervening slave pulse or (*b*) the occurrence of two slave pulses without an intervening master pulse. Such first and second output signals appear on terminals 55 and 56, respectively, and are supplied to means which correctively changes the speed of one engine (or the frequency of one input pulse train) in one sense or the other, respectively.

The master pulses are caused to switch a bistate device to one of its states (or leave it in that state) and the slave pulses are caused to switch that same bistate device to its other state (or leave it in its other state). Although the bistate device may take any of several different forms well known per se to those skilled in the art, that here represented in block form is an Eccles-Jordan circuit commonly called a flip-flop 60. Discrete signals or pulses applied to input terminals of such a flip-flop trigger it to switch rapidly from one condition to the other. As illustrated in FIG. 1, the flip-flop 60 in well known fashion has set or reset terminals 60*s* and 60*r* together with output terminals F1 and $\overline{F1}$. This is a conventional symbolic designation, indicating that an input pulse applied to the set terminal 60*s* switches the flip-flop to (or leaves it in) the "1" state, producing a binary "1" level signal at the F1 output terminal. Each pulse applied to the reset terminal 60*r* switches the flip-flop to (or leaves it in) the "0" state, producing a binary "0" level signal at the F1 output terminal. The signal at the $\overline{F1}$ output terminal is simply the complement of that at the F1 output treminal, and thus has a binary "0" or "1" voltage level when the flip-flop is in the "1" or "0" states respectively. As here illustrated, the master and slave pulses 49 and 50 are respectively applied to the input terminals 60*s* and 60*r* so that under normal circumstances the flip-flop 60 will be repeatedly set and reset in response to the alternately occurring pulses in the first and second trains.

Logic devices in the synchronizing unit U are controlled according to the state of the flip-flop 60 so as to create the first or second type of output signal in the event that the flip-flop does not switch states (but on the contrary is left in its existing state) in response to the arrival of a master pulse or a slave pulse. Such logic devices take the form of two AND gates 62 and 63 having first input terminals 62*a* and 63*a* coupled to receive the master and slave pulses, respectively; and having second input terminals 62*b* and 63*b* connected to receive the control signals or voltages appearing at the flip-flop terminals F1 and $\overline{F1}$. The output terminals of the two AND gates are the two terminals 55 and 56 mentioned above.

As is well known, such AND gates produce an output signal only when both of their inputs simultaneously receive an input signal. Stated another way, each AND gate produces a binary "1" output only so long as both input terminals receive a binary "1" level input signal. Since each pulse applied to the terminal 62*a* may be considered as a short "1" signal, the AND gate 62 will produce a pulse on its output terminal 55 in response to a given one of the master pulses 49 only if that master pulse applied at an instant when the flip-flop 60 is in its "1" state. Thus, an output pulse appears on terminal 55 only under those conditions where two master pulses occur without an intervening slave pulse having appeared to reset the flip-flop prior to the arrival of the second such master pulse.

On the other hand, the AND gate 63 will be "open" to pass a slave pulse applied to the terminal 63*a* only if the flip-flop 60 is already in its "0" state at the instant when such slave pulse arrives. This means that an output pulse will appear on the terminal 56 only as a result of two slave pulses occurring in succession without an intervening master pulse having appeared to set the flip-flop to the "1" state prior to the arrival of the second such slave pulse.

As more fully explained below, first output pulses will appear on the terminal 55 only if the slave engine 22 is running more slowly than the master engine 20, and second output pulses will appear on the terminal 56 only when the slave speed is higher than that of the master. To provide a corrective response to such first and second types of output pulses, they are respectively transmitted to the speed increasing or decreasing windings W*i* or W*d* of the stepping motor 39 so as to cause stepped movement of the arm 30 in a direction to increase or decrease the speed of the slave engine 22 until it equals that of the master engine. Preferably, the output pulses which appear at the terminals 55 and 56 are passed through driver amplifiers 65 and 66 in order to give a proper magnitude and shape to the pulses which are applied to the windings W*i* and W*d*.

Figure 4:
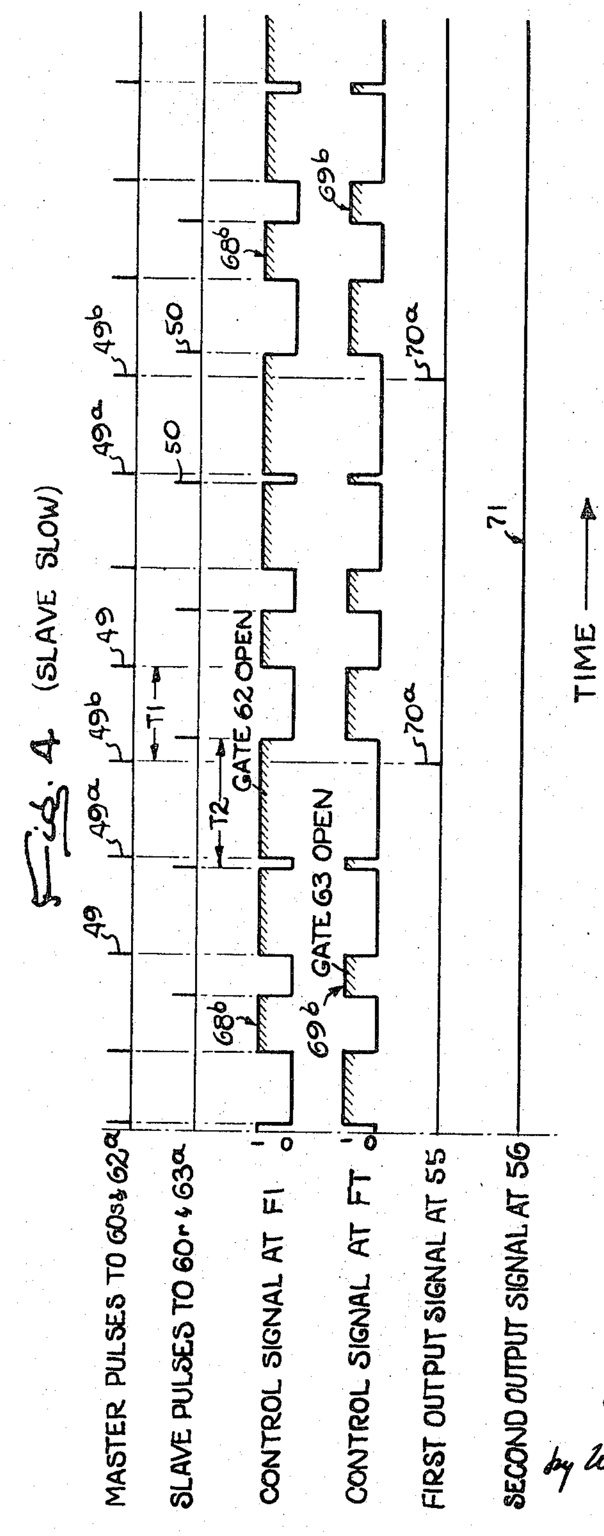
FIG. 4 is a timing diagram similar to FIG. 3, but illustrating the relationships of signals when the slave engine is running slower than the master engine.

The operation of the synchronizing system shown in FIG. 1 can best be understood with reference to the timing diagrams of FIGS. 2–4 which illustrate the various signals as they appear under different conditions. FIG. 2 shows the relationship of the master pulses 49 and the slave pulses 50 when the master and slave engines have equal speeds. Under this condition, the frequencies of the master and slave pulses 49 and 50 are equal, and the periods T1 between successive master pulses are equal to the periods T2 between successive slave pulses. Since each master pulse sets the flip-flop 60 to its "1" state, the signal voltage at the terminal F1 takes the form illustrated by the curve 68 in FIG. 2, having a relatively high or binary "1" value during those intervals following each master pulse until the next slave pulse appears to reset the flip-flop to its "0" state. Immediately following each slave pulse 50, the signal appearing at the terminal F1 has a relatively low or "0" value until the next master pulse appears to again switch the flip-flop to its "1" state. On the other hand, the control signal appearing at the terminal $\overline{F1}$ is the mirror image or complement as illustrated by the curve 69 in FIG. 2. The gate 62 is conditioned to pass master pulses applied to its terminal 62*a* during those intervals when the signal represented at 68 in FIG. 2 has a "1" level (shaded portions); and conversely the AND gate 63 is conditioned to pass a slave pulse applied to its terminal 63*a* during those intervals when the control signal shown at 69 in FIG. 2 has a "1" level (shaded portions). If a master pulse occurs at an instant when the flip-flop 60 is in its "0" state, then it cannot pass through the AND gate 62 but it does act to switch the flip-flop to its "1" state. In that case, the gate 62 does not "open" quickly enough to pass the same master pulse which causes the flip-flop to switch because of the short but finite switching time of the flip-flop. The same is true of slave pulses which arrive when the flip-flop is in its "1" state; they switch the flip-flop to the "0" state but do not pass through the gate 63 to the terminal 56.

Inspection of FIG. 2 will confirm that when the master and slave engines are operating with equal speeds and the pulses 49 and 50 have equal frequencies, neither the AND gate 62 nor the AND gate 63 is conditioned to transmit a master pulse or a slave pulse to the output terminal 55 or 56. As each of the master pulses arrives, it finds the gate 62 closed and cannot pass to the output terminal 55. It does, however, switch the flip-flop 60 to the "1" state. As each of the slave pulses arrives it finds the flip-flop in the "1" state and the gate 63 thus "closed" so that it cannot pass to the output terminal 56; but it resets the flip-flop 60 to the "0" state. The output signals which appear on terminals 55 and 56 are illustrated at 70 and 71 in FIG. 2 by lines indicating that no pulses whatever appear. Thus, when the speeds of the engines are equal, no corrective action takes place.

FIGURE 3 illustrates the timing relationships existing when the slave engine is running faster than the master engine. Under these circumstances the master pulses 49 have a frequency less than the slave pulses 50, and the period T1 between succeeding master pulses is greater than the period T2 between successive slave pulses. The control signals appearing at the flip-flop terminals F1 and $\overline{F1}$ thus have the form shown at 68*a* and 69*a*, the flip-flop 60 normally being set by a master pulse and then reset by a slave pulse which appears before the succeeding master pulse. However, as the operation continues there will be periodic occasions when two slave pulses 50*a*, 50*b* occur in succession without an intervening master pulse. This will happen because the period T2 is shorter than the period T1. It will be seen from FIG. 3 that in those instances the first slave pulse 50*a* will trigger the flip-flop 60 causing it to switch to the "0" state and applying a binary "1" signal level to the input terminal 63*b* of the AND gate 63. By the time the next slave pulse 50*b* appears, the flip-flop 60 is still in its "0" state, and although that pulse has no effect on the flip-flop, but it is transmitted through the AND gate 63 to the output terminal 56. Such output pulses appearing on the terminal 56 are shown at 71*a* in FIG. 3. As indicated at 70 in FIG. 3, no pulses are passed to the output terminal 55 when the slave engine is running faster than the master, because two master pulses cannot occur in succession without an intervening slave pulse. Of course, under the conditions illustrated by FIG. 3, the output pulses 71*a* will be transferred from the terminal 56 to the speed decreasing winding W*d* and will cause the stepping motor 39 to shift the arm 30 in a speed decreasing direction. Thus, the condition illustrated by FIG. 3 cannot long persist since the speed of the slave engine 22 will be increased until the frequency of the slave pulses is increased to substantially equal that of the master pulses.

As shown in FIG. 4, when the slave engine is running at a speed which is slower than the master engine, the master pulses 49 will have a greater frequency and a shorter period T1 than the frequency and the period T2 of the slave pulses 50. Under these circumstances, the gate 63 can never be open when a slave pulse 50 appears, but periodically two succeeding master pulses 49*a* and 49*b* will occur without an intervening slave pulse. The first such master pulse 49*a* switches the flip-flop 60 to "1" state, and causes the signal at terminal F1 (represented by the waveform 68*b*) to rise to the binary "1" level. Accordingly, when the next master pulse 49*b* appears, simply leaves the flip-flop in the "1" state, and it passes from the input terminal 62*a* through the gate 62 to the output terminal 55 where it appears as a pulse 70*a*. These output pulses 70*a* on the terminal 55 are thence applied to the speed increasing winding W*i* in the stepping motor 39 and the latter thus causes the speed-controlling arm 30 to be stepped in a direction to increase the speed of the slave engine 22. This corrective action will continue until the speed of the slave engine has been increased sufficiently to make the frequencies and periods of the master slave pulses substantially equal. As shown in FIG. 4, when the slave engine is running slower than the master engine, the control signal (represented at 69*b*) appearing at the terminal $\overline{F1}$ is never at a binary "1" level when a slave pulse 50 appears on the gate input terminal 63*a*. Thus, no output pulses appear on the terminal 56, as illustrated by the lack of pulses at 71 in FIG. 4.

*Elimination of time "jitter" effects*

In the use of the digital synchronizing apparatus described above to maintain the speeds of the two engines 20, 22 and the frequencies of the master and slave pulses 49, 50 equal, it may sometimes happen that the individual pulses in the first and second pulse trains are not equally spaced in time from one another. That is, although the frequency of a speed-representing generated pulse train may be quite constant on the average, the individual pulses may "jitter" back and forth from the precise precisions in time which they should theoretically occupy. This may occur particularly in the illustrated case where pulses whose frequency indicates speeds are produced by driving a signal generator from the shaft of a reciproating engine. The output shaft of an internal combustion engine may in fact "torsionally vibrate" to a small extent so that its instantaneous speed is quite erratic even though its normally observed average speed is quite constant. Such torsional vibration is created, for example, (*a*) by torque pulses applied to the engine shaft because ignition in the individual cylinders of an internal combustion engine occurs at discrete time-spaced instants, (*b*) by loose bearings or other factors which create "piston slap," (*c*) by gears which do not uniformly transmit torque due to backlash or imperfectly mated teeth, (*d*) or by rotating parts which are not perfectly balanced. Thus, the angular velocity of the driven pulse generator rotor may "jitter" and the pulses produced by it will not have perfectly uniform spacing in time even when the normally observed average speed of the engine is constant.

Figure 6:
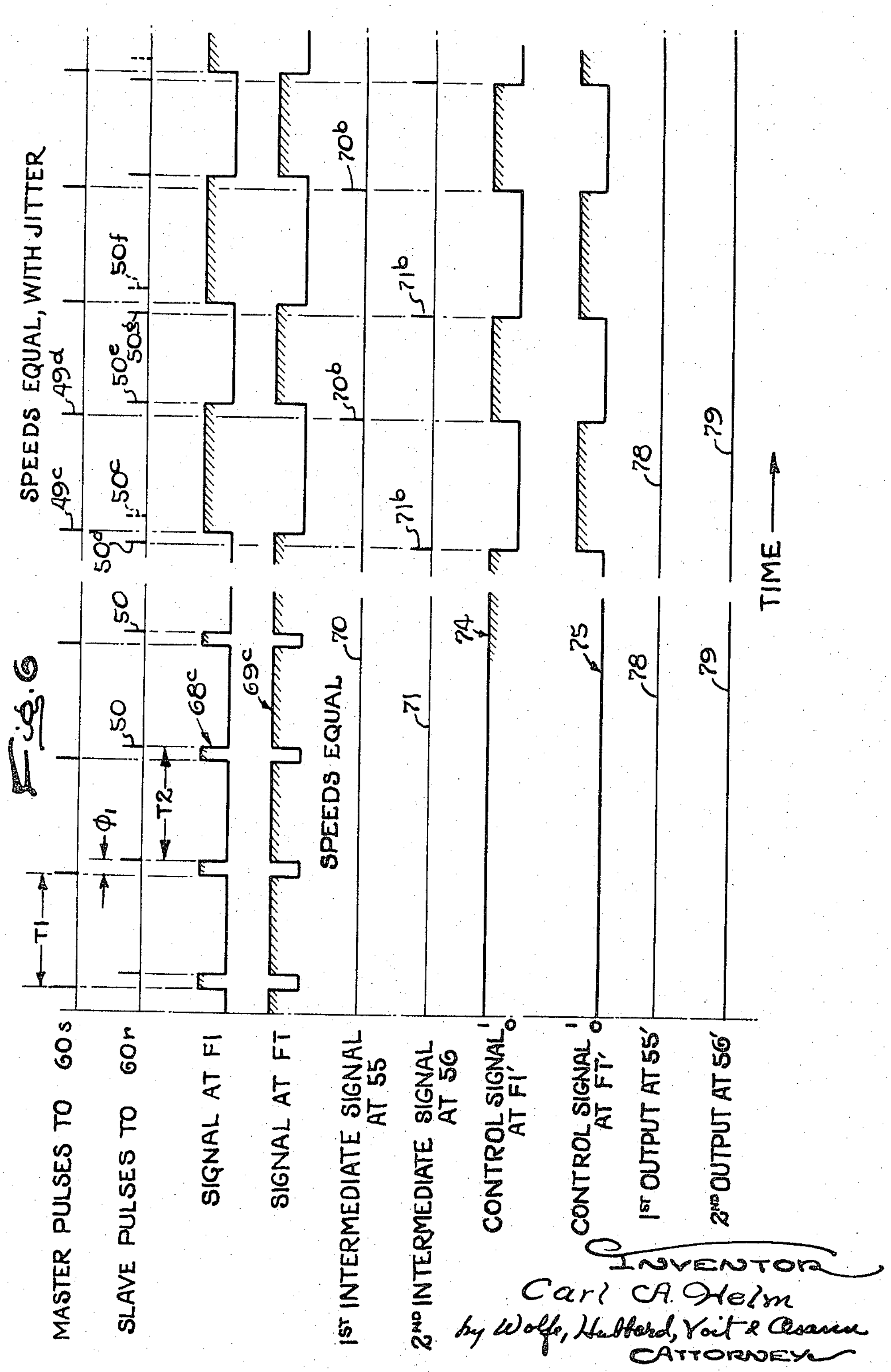
FIG. 6 is a timing diagram illustrating the relationships between various signals which occur in the apparatus of FIG. 5 and illustrating how spurious responses due to torsional jitter are eliminated when the master and slave speeds are equal.

When generated pulses "jitter" from their normal time spacing, the effect may be to cause the digital synchronizing system to initiate speed corrective action although none is in fact required. This is graphically illustrated by FIG. 6 wherein the left portion shows operation of the synchronizing system with theoretically perfect, uniform spacing of input pulses, and the right portion shows the effect of pulse "jitter." In the left portion of FIG. 6 the master pulses 49 and the slave pulses 50 are shown with equal frequencies and equal periods T1 an T2, but with a relatively small phase angle $\phi 1$ separating successive ones of the master and slave pulses. Thus, the left portion of FIG. 6 illustrates a condition in which the speeds of the master and slave engines (FIG. 1) are constant and equal, so that the control signals at terminals F1 and $\overline{F1}$ have the forms shown at 68*c* and 69*c*. No speed-corrective output signals appear at the terminals 55 and 56, as represented by the lack of pulses at 70 and 71 in the left portion of FIG. 6. The system is thus in speed synchronism substantially as shown and described above with reference to FIG. 2.

However, the theoretically perfect and uniform spacing of the pulses 49 and the pulses 50 as illustrated in the left portion of FIG. 6 does not always occur in actual practice. As shown in the right portion of FIG. 6, that particular slave which should appear at the phantom position 50*c* is assumed to occur earlier as a pulse 50*d* due to torsional vibration. It is assumed that the next slave pulses 50*e* appears at its normal position in time (lagging the previous master pulse by the phase angle $\phi 1$). And it is further assumed that the next slave pulse which would normally appear at the time position 50*f* is again displaced in time so as to appear as a pulse 50*g* which leads the corresponding master pulse by a short time interval. Thus, the pulses 50*d*, 50*e*, and 50*g* in the right portion of FIG. 6 represent "jittering" of the slave pulses back and forth about the normal instants in time which they should occupy. Of course, it is very possible and probable that the master pulses may also jitter back and forth in time, but the illustration in the right portion in FIG. 6 will suffice to illustrate the phenomenon and its adverse effect.

Notice from FIG. 6 that when the pulse 50*d* is shifted due to jitter so that it occurs prior to the master pulse 49*c*, it arrives when the flip-flop 60 (FIG. 1) is in the "0" state, and when the control signal 69*c* is at a binary "1" level. Thus, that slave pulse 50*d* passes through the AND gate 63 to appear at the output terminal 56 as an output pulse 71*b*, even though no speed-corrective action is required. Similarly, with the assumption that the slave pulse 50*e* occurs subsequent to its associated master pulses 49*d*, the two master pulses 49*c* and 49*d* occur in succession without an intervening slave pulse. Thus, the master pulse 49*d* appears at an instant when the control signal 68*c* at the terminal F1 (FIG. 1) has a binary "1" level, and this master pulse passes through the gate 62 to appear at the output terminal 55 as an improper speed-increasing pulse 70*b*. Then, the next two slave pulses 50*e* and 50*g* occur without an intervening master pulse, and thus the slave pulse 50*g* passes through the gate 63 to appear as a speed-decreasing pulse 71*b* on the terminal 56.

When the master and slave pulses 49 and 50 have substantially equal frequencies and are closely related in phase, torsional vibration and jitter can cause rapid pulsing of the stepping motor 39 (FIG. 1) first in one direction and then in the other. The result is indecisive operation, or a tendency to make the stepping motor stall or lock up. This effect of torsional vibration and pulse jitter is thus highly undesirable.

The adverse effects of pulse jitter are obviated by treating the first and second output signals (previously described as appearing on the terminals 55 and 56) as intermediate signals which are supplied to a second binary logic unit U′ as shown in FIG. 5. This second unit U′ serves as means to produce first or second correction output signals respectively in response to (*a*) the occurrence of two of the first intermediate signals without an intervening second intermediate signal, or (*b*) the occurrence of two of the second intermediate signals without an intervening first intermediate signal.

This is accomplished as illustrated in FIG. 5 by connecting the synchronizing unit U (previously described with reference to FIG. 1) in tandem with a second substantially identical logic unit U′, the output pulses appearing at the terminals 55, 56 being intermediate signals which are applied as the input signals to the terminals 60*s′* and 60*r′* of the second unit. More particularly, the second binary logic unit U′ comprises a bistate flip-flop 60′ having its output terminals F1′ and $\overline{F1'}$ connected to supply control signals to the input terminals 62*b′* and 63*b′* of two AND gates 62′ and 63′. The intermediate signals which appear on the output terminals 55 and 56 of the first unit U are supplied as input signals to the set terminal 60*s′* and the reset terminal 60*r′*, respectively, and also to the two AND gate terminals 62*a′* and 63*a′*, respectively. The second unit U′ thus operates in the same manner as that described previously for the first unit U, except that the unit U′ receives as its input signals the output pulses or intermediate signals from the first unit. The output terminals 55′ and 56′ of the second unit U′ are connected to supply output pulses appearing thereon through the driver amplifiers 66 and 65 to the slave speed increasing or decreasing windings W*i* and W*d* of the stepping motor 39.

Referring now to FIG. 6, the operation of the apparatus shown in FIG. 5 may be made clear. Since as illustrated by the left portion of FIG. 6 there are no intermediate pulses appearing on the terminals 55 and 56 (see curve portions 70 and 71) when the two engine speeds are equal and the master and slave pulses 49 and 50 have theoretically perfect time spacing, the second unit U′ receives no input signals and produces no output signals on its terminals 55′ and 56′. This is indicated by the curve portions 78 and 79. However, even with pulse jitter as illustrated in the right portion of FIG. 6, when the first intermediate signal 71*b* appears at the terminal 56, it serves to reset the flip-flop 60′ so that the control signal 74 at the terminal F1′ is switched from a binary "1" to a binary "0" level. The intermediate pulse 71*b* thus cannot pass through the AND gate 63′ and does not appear as an output signal on the terminal 56′. Thus, the stepping motor 39 is not actuated even though pulse jitter has caused a spurious output signal 71*b* on the terminal 56.

The first intermediate pulse 71*b* in resetting the flip-flop 60′ switches the control signal 74 at terminal F1′ to a binary "0" level, and switches the control signal 75 at terminal $\overline{F1'}$ to a binary "1" level. When the next intermediate signal 70*b* appears at the terminal 55, therefore, it cannot pass through the AND gate 62′ to the terminal 55′; and it serves to switch the flip-flop 60′ from its "0" state to its "1" state. Thus, the spurious pulse 70*b* created by torsional jitter producer no output pulse to actuate the stepping motor 39. Similarly when the next intermediate pulse 71*b* apears on terminal 56 (as shown in FIG. 6), it finds the gate 63′ closed and it resets the flip-flop 60′ without passing to the output terminal 56′. With the speeds of the two engines 20, 21 equal, no pulses (as indicated at 78 and 79 in FIG. 6) are applied to the stepping motor 39 even though torsional vibration produces the pulse jitter illustrated by the slave pulses 50*d*, 50*e*, 50*g* in the right portion of FIG. 6.

Figure 7:
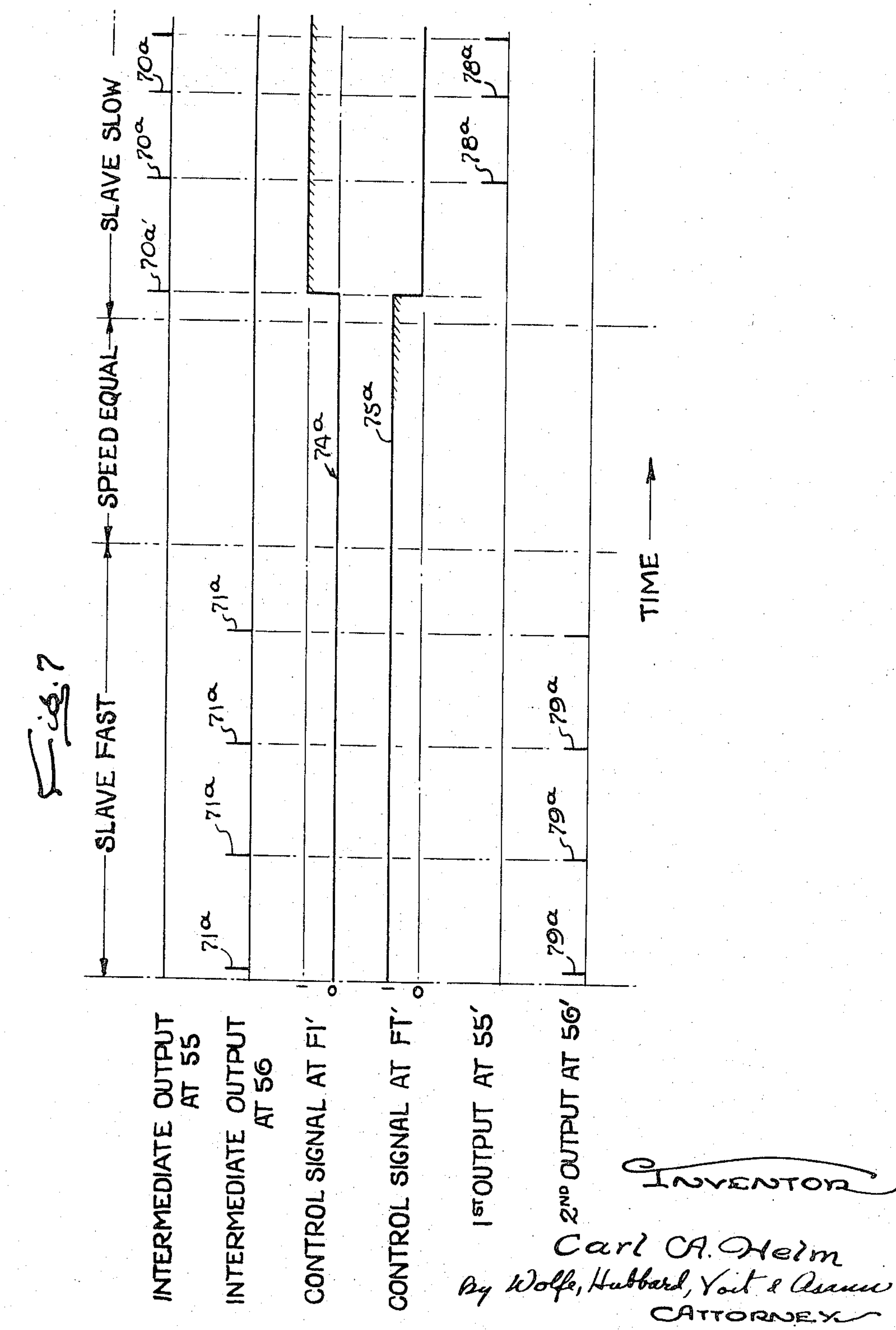
FIG. 7 is a timing diagram illustrating the operation of the apparatus of FIG. 5 as the slave speed changes from a value faster than that of the master to values equal and slower than the master.

Viewed in a different aspect, the second digital logic unit U′ shown in FIG. 5 acts as a "filter" to block one speed-correcting output signal whenever the speed of the slave engine passes through equality with the speed of the master engine. The left portion of FIG. 7 illustrates the signal relationships when the slave is running faster than the master engine so that intermediate pulses 71*a* appear repeatedly on the terminal 56 in FIG. 5. As these successive pulses are applied to the second unit U′, they attempt repeatedly to switch the flip-flop 60′ to its "0" state, but that flip-flop is already in such state and the gate 63′ is already open. Therefore, the intermediate pulses 71*a* created by the first unit U when the slave is running faster than the master engine pass through the second unit U′ and appear as speed-correcting output signals 79*a* which are routed from the terminal 56′ to the winding W*d* and cause the stepping motor 39 to step the arm 30 in a direction to decrease the speed of the engine 22.

Then, when the speeds of the two engines become equal, the first unit U′ produces no intermediate signals on its output terminals 55 and 56, and so no output signals appear on the terminals 55′ and 56′ of the second unit U′. This condition is illustrated by the mid-portion of FIG. 7. If the speed of the slave engine 22 should now further decrease and become slower than that of the master engine (refer to the right portion of FIG. 7), the first unit U′ will produce a series of intermediate pulses 70*a* on its output terminal 55, and these will be supplied as input signals to the terminals 60*s′* and 62*a′* of the second unit U′. However, the first such intermediate signal 70*a′* will find the flip-flop 60′ in its "0" state; it will not pass through the gate 62′, but it will set the flip-flop 60′ to its "1" state. The control voltages 74*a* and 75*a* at the terminals F1, $\overline{F1'}$ will thus be switched to the "1" and "0" levels, respectively. Thus, the first intermediate pulse 70*a′* following a condition of equal speeds does not pass to the output terminal 55′, but the succeeding intermediate pulses 70*a* are passed through the AND gate 62′ to appear as final output pulses 78*a*. The latter are applied to the motor winding W*i* and cause the arm 30 to be stepped in a direction to increase the speed of the slave engine.

The second unit U′ thus renders the synchronizing system, as a whole, relatively insensitive to speed errors which exist just after the master and slave pulses indicate that there has been a change from equal speeds to unequal speeds. Yet, once that period of insensitivity has been exceeded, the system works in a normal fashion, while eliminating spurious responses due to pulse jitter. The arrangement of FIG. 5 may be supplemented to employ two or more of the units U′ connected in tandem so as to provide a wider band of insensitivity and to eliminate the adverse effects of extremely wide time variations or jitter in the speed-indicating master and slave pulse trains.

*Elimination of coincidence effects*

The system of FIG. 5 is adequate for synchronizing two pulse train frequencies or two shaft speeds in many applications. However, in certain cases there may be a noticeable hunting or lack of precision due to inconsistent responses when a master pulse and a slave pulse occur substantially in time coincidence. For example, if the flip-flop 60 is in its "0" state, and pulses 49 and 50 arrive at the terminals **60*s* and 60*r*** almost simultaneously, the result might be either (*a*) to leave the flip-flop in its "0" state, (*b*) to switch the flip-flop to its "1" stated and leave it there, or (*c*) to switch the flip-flop to its "1" state and then immediately reset it to the "0" state. In the first case, an intermediate pulse appears on the terminal 56 and the gate 63 is left conditioned to pass the next slave pulse; whereas in the second case, an intermediate pulse appears on the terminal 56 and the gate 62 is left conditioned to pass the next master pulse; and in the third case no pulse appears on the terminals 55 and 56, and the apparatus is conditioned to pass the next slave pulse which is received. This inconsistency of response can exist even when the speeds of the two engines 20, 22 are equal if the master and slave pulses have substantially the same phase, thereby producing corrective action when none is, in fact, required.

In accordance with one aspect of the present invention, the system is made consistently non-responsive to both master and slave pulses which appear at substantially the same instants in time. This is accomplished by an anti-coincidence unit A shown enclosed by dotted lines in FIG. 8*b*, the system of FIGS. 8*a* and 8*b* being otherwise similar to that of FIG. 5. The unit A includes means for delaying the master pulses and the slave pulses for equal short intervals d1 before they are permitted normally to enter the synchronizing unit U as input pulses, together with means for measuring off a time interval t1 from each instant that a master and slave pulse appears in time coincidence. The delay d1 is shorter than the time interval t1, and means are provided to block entry of the delayed pulses into the unit U if they occur during the time interval t1.

As specifically shown in FIGS. 8*a* and 8*b*, an AND gate 80 is coupled to receive on its two input terminals **80*a*, and 80*b* the master and slave pulses 49 and 50. The output terminal 80*c* of that gate is connected to the triggering input terminal 81*a* of a monostable or "one-shot" multivibrator 81. Only if a master pulse 49 and a slave pulse 50 occur in coincident, overlapping relationship will the AND gate 80 produce a special signal, indicative of pulse coincidence, to trigger the one-shot device 81. Upon triggering, however, the one-shot device will switch from its normal or "0" state to its set or "1" state, and then reset automatically after a time interval t1. This is the well known characteristic operation of bistate one-shot multivibrators. An output terminal 81*b* of the one-shot device, and in this case, the complement terminal which normally resides at a binary "1" level, is placed at a binary "0" level during each time interval t1 measured off subsequent to triggering of the one-shot device 81**.

The output terminal **81*b* is connected to input terminals 84*a*, 85*a* of two AND gates 84, 85. These gates receive on their second input terminals 84*b* and 85*b* third and fourth trains of pulses 49′ and 50′ which are created by passing the master and slave pulses 49 and 50 through delay devices 86 and 87 which produce equal time delays d1. The pulses 49′ and 50′ are thus identical to the master and slave pulses 49 and 50** but are delayed in time therefrom by equal short periods.

If the one-shot multivibrator is not triggered, the terminal **81*b* resides at a binary "1" level, and the AND gates 84 and 85 are both open. Under these circumstances, the delayed pulses 49′ and 50′ pass through the gates 84 and 85 to form the first and second input pulse trains to the synchronizing unit U, and the operation of the system as a whole is the same as described above. However, if a particular master pulse 49 occurs substantially simultaneously with one of the slave pulses 50, i.e., if those two pulses are not separated by more than the resolving time of the AND gate 80, then the one-shot multivibrator 81 will be triggered, and the terminal 81*b* will reside at a binary "0" for the ensuing period t1. Those same master and slave pulses will be converted into delayed pulses 49′ and 50′ which arrive at the terminals 84*b* and 85*b* after a delay period d1 and before the time interval t1 expires. Thus, those two delayed pulses will both be blocked by the gates 84 and 85, and cannot enter the synchronizing unit U as input signals. In effect, the input pulse for the unit U are fifth and sixth pulse trains which are constituted only by pulses of the third and fourth trains of pulses 49′ and 50′**, respectively, which occur at times other than during the interval t1. The anti-coincidence unit A makes the system as a whole consistently ignore master and slave pulses which are substantially time coincident. This eliminates inconsistency of response, yet, does not otherwise adversely affect the system because infrequent blocking of a few correction signals is hardly detectable.

*Phase matching logic unit*

Once the speeds of the engines 20, 22 have been made equal, it is desirable to further adjust the engines so that their shafts turn with a constant, fixed phase relation. When the slave shaft lags or leads the master shaft, the throttle of the slave engine may be opened or closed very slightly and momentarily to speed up or slow down the slave engine until phase agreement is reached. This may be accomplished by a very simple phase matching device P (FIG. 8*a*) which operates entirely on digital signals and in conjunction with the synchronizing system described above.

In order to produce first and second trains of discrete signals which by their relative timing or phase displacement represent the phase angle between the rotating shafts of the master and slave engines, means are provided to produce a reference pulse each time the master engine shaft passes through a predetermined angular position, and a similar means is employed to produce a measuring pulse each time the slave engine shaft passes through a predetermined angular position. The two angular positions may be, but need not be, identical. As illustrated in FIG. 8*a*, the reference pulses are generated in a stationary induction coil 90 each time a single projection or tooth 91 carried by a disk fixed to or driven from the master engine output shaft passes an associated core 92. Similarly, a measuring pulse is generated in an induction coil 94 at each instant that a single tooth 95 carried by a disk fixed to or driven from the slave engine output shaft passes an associated stationary core 96. The pulses induced in the windings 90 and 94 are passed through conventional amplifiers or pulse shapers 98 and 99 so that reference pulses 100 and measuring pulses 101 appear at their outputs as shown in FIG. 8*a*, such pulses by their relative time spacings being indicative of the phase angle between the master engine and slave engine output shafts.

To provide automatic correction in the event of phase mismatch after the engine speeds are equal, means are provided to produce a bi-valued control wave which has first and second values during approximately the first and second halves of the period between each two succeeding ones of the reference pulses in the first pulse train 100. In the present example, such means are constituted by a monostable or "one-shot" multivibrator 104 having its input triggering terminal 104*a* connected to receive the reference pulses 100, and so constructed that its natural timing interval is half of that which separates succeeding reference pulses when the master engine 20 is operating at its normal speed. Merely by way of example, if the normal operating speed of the engine 20 is 3,000 r.p.m., twenty milliseconds elapse during each revolution of the output shaft. Thus, the reference pulses 100 are spaced apart by 20 milliseconds and the timing interval of the one-shot multivibrator 104 would be made, by choice of the resistance-capacitance circuits therein, equal to 10 milliseconds.

Referring for the moment to FIG. 9, the reference pulses 100 are there shown spaced apart by time periods T. The control wave produced at the output terminal 104*b* of the one-shot device 100 thus has the form illustrated at 106 in FIG. 9, i.e., it resides at a binary one level immediately after each reference pulse and for a time interval *T*/2, whereupon it returns to the binary "0" level. The control wave 106 appearing at the output terminal 104*b* may be passed through an inverter in order to derive a complementary waveform. Preferably, however, complement of the waveform 106 is obtained simply by connection to the opposite output terminal 104*c* of the one-shot device 104, the complement of the control wave 106 being shown at 107 in FIG. 9.

In order to create a first output signal in response to a measuring pulse occurring while the control waveform 106 has a first one of its two possible values, the output terminal 104*b* is connected to one input 110*a* of an AND gate 110, and the measuring pulses 101 are applied to a second input terminal 110*b*. Further, in order to create a second type of output signal in response to a measuring pulse occurring while the control wave 106 has the second of its two possible values, the complement control wave 107 is passeed from the output terminal 104*c* to one input 111*a* of an AND gate 111 whose second input terminal 111*b* also receives the measuring pulses 101. The output terminals 110*c* and 111*c* of the two AND gates send their signals through driver amplifiers 112 and 113, respectively, to the throttle increasing and decreasing windings W*i* and W*d* of the stepping motor 39 previously described.

The operation of this phase matching system will become clear from a brief study of FIG. 9 wherein the left portion illustrates the measuring pulses 101 lagging the reference pulses 100 by phase angles $\phi 2$. At the instant the measuring pulses 101 are applied to the input 111*b* of the gate 111, the complement control wave 107 is at a binary "0" level and the gate 111 is therefore closed so that it cannot pass pulses through the driver amplifier 113 to the winding W*d*. However, at those instants when the measuring pulses 101 are applied to the terminal 110*b*, the control waveform 106 produced at the output terminal 104*b* of the one-shot device 104 is at a binary "1" level, and those pulses thus pass through the AND gate 110 to form output pulses 115 which are transmitted by the driver amplifier 112 to energize the motor winding W*i*. Thus, whenever the slave engine output shaft lags the master output shaft, first output pulses 115 will be periodically applied to the winding W*i* and the stepping motor 39 will shift the arm 30 in a direction to open the throttle of the slave engine.

The right portion of FIG. 9 illustrates the operation of the phase matching system whenever the slave output shaft leads the master output shaft and the measuring pulses 101 lead the corresponding reference pulses 100 by phase angles $\phi 3$. Under these conditions, the complement waveform 107 will reside at a binary "1" level when each of the measuring pulses 101 occurs, and those pulses will thus be transmitted by the gate 111 as output pulses 116 to the driver amplifier 113 and the motor winding W*d*. On the other hand, when each of the measuring pulses 101 appears on the input terminal 110*b* of the gate 110, the control wave 106 of the output terminal 104*b* will be at a binary "0" level, and such pulses will be blocked by the gate 110 from reaching the driver amplifier 112.

In effect, the one-shot multivibrator 104 constitutes a "period splitter" which measures off the first and second halves of the time interval between two successive ones of the reference pulses 100. In other words, it signals two respective intervals of time during which the master engine output shaft resides at positions separated within two ranges of 0° to +180° and 0° to −180° from the predetermined angular position mentioned above. The AND gate 110 is a "lag" gate which conducts pulses only if the measuring pulses lag the reference pulses, i.e., occur within a time interval corresponding to a 180° angle following the appearance of a reference pulse. The AND gate 111 constitutes a "lead" gate, which creates or transmits the second output pulses which are applied to the winding W*d* only when the measuring pulses occur within a time interval corresponding to a 180° angle prior to the succeeding one of the reference pulses. The first and second output pulses appear on the terminals 110*c* and 111*c* thus constituting correction signals which serve to change the relative phase of the two engine output shafts in one sense or the other so as to bring those shafts back into phase agreement.

*Deadband control for improved phase stability*

The phase matching system thus far described detects solely whether the slave shaft is lagging or leading, i.e., whether the measuring pulses 101 lag or lead the reference pulses 100, and it creates a corrective signal of one kind or the other regardless of how great or how small the phase error may be. Indeed, even if the reference and measuring pulses are perfectly time coincident and matched in phase, it is possible that one or the other of the gates 110, 111 could pass a correction pulse and thus cause an unwarranted change in phase. Moreover, because corrections are made in small finite increments by the stepping of the slave throttle arm 30, it is possible that when the slave shaft is slightly lagging the master shaft by only two or three degrees, one corrective pulse applied to the winding W*i* could open the slave throttle sufficiently to make the slave shaft advance to a position where it leads the master shaft by 6 or 7 degrees. Thus, the phase matching system described with reference to FIGS. 8*a* and 8*b* is one which will continually hunt and correct, keeping the phase angle small but not constant.

Such continuous correction may be entirely adequate and acceptable in many cases. Yet, in accordance with the present invention, an improved phase matching system may be constructed as shown in FIG. 10 to create a deadband in the phase correcting response and enable the system to match the phase of shafts or pulse trains with greater precision and without continuous correction and hunting.

The improved phase matching system P′ of FIG. 10 is similar to the system P shown in FIG. 8*a*, and like reference characters have been applied to like parts in FIG. 10. However, the apparatus of FIG. 10 employs additional components which are distinguished by being drawn in heavy lines. As a first additional component to the basic phase matching system, means are provided which respond to pulses in the first train, i.e., to each of the reference pulses 100, for a bi-valued creating deadband signal which is changed from its normal first value to its second value during a time interval equal to a predetermined fraction of the period T (between successive reference pulses) following each of those reference pulses. For this purpose, the reference pulses 100 are applied to the triggering terminal 120*a* of a bistate one-shot multivibrator 120 having a complement output terminal 120*b*. In response to each reference pulse, the one shot device 120 is set to its "1" state for a short time interval D, and it then resets automatically to the "0" state. The deadband signal at the complement terminal 120*b* thus switches to a binary "0" level for the time interval D and then returns to its normal "1" binary level. This bi-valued deadband signal is employed in a manner which will be made clear below.

As will be more fully explained below, the time interval D determines the width of the deadband in the corrective response. Assuming that the master and slave engine shafts have a normal speed of 3,000 r.p.m. so that the period between the succeeding reference pulses 100 is 20 milliseconds, and if it is desired to make the deadband inhibit corrective action when the two shafts are within 10° of a perfect phase match (i.e., ±5° phase error), then the one-shot device 120 would be constructed to provide a timing interval of about 0.556 millisecond. This is the time required for the engine shafts to rotate through an angle of 10°.

As a second additional component, means are provided to create a train of auxiliary reference pulses like the original reference pulses 100 but delayed in time by an interval approximately equal to half of the timing period D of the one-shot multivibrator 120. As here shown, the master pulses 100 are passed through a time delay device 121 having a delay interval *D*/2 (e.g., 0.278 millisecond) and whose output pulses 100' are auxiliary reference pulses supplied as triggering inputs to the one-shot multivibrator 104. Thus, the one-shot device 104 functions as previously described, except that it now produces a bi-valued control wave which has first and second values during first and second halves of the period T between two successive ones of the auxiliary pulses 100'.

Further, the output terminals 110*c*, 111*c* of the gates 110 and 111 are connected to the input terminals 122*a*, 124*a* of two additional AND gates 122, 124 whose remaining input terminals 122*b*, 124*b* are both connected to receive the bi-valued deadband signal from terminal 120*b* of the one-shot device 120. The output terminals 122*c* and 124*c* of the two additional gates 122, 124 connect to the driver amplifiers 112 and 113 which in turn supply actuating pulses to the stepping motors W*i* and W*d*.

The AND gates 110 and 122 form triple-input AND logic circuitry receiving as input signals (*a*) the bi-valued control wave appearing at the terminal 104*b* of the one-shot device 104, (*b*) the bi-valued deadband signal appearing at the terminal 120*b* of the one-shot device 120, and (*c*) the measuring pulses 101 produced by the pulse generator 96. A first type of corrective output pulse is created on the terminal 120*c* and thus supplied to the stepping motor winding W*i* in response to the occurrence of a measuring pulse 100 only if at that instant the control wave produced at the terminal 104*b* has its first or binary "1" value and if the deadband signal at the terminal 120*b* also has its first or binary "1" value. On the other hand, the two AND gates 111 and 124 also form triple-input AND logic circuitry. A second type of corrective output pulses is created on the terminal 124*c* and supplied to the motor winding W*d* only if at the instant a measuring pulse 101 occurs the control wave at the terminal 104*b* has its second or binary "0" value (so that its complement wave at the terminal 104*c* has a binary "1" value) and if the deadband signal at the terminal 120*b* has its first or binary "1" value. In effect, therefore, the gates 110 and 111 are controlled by the one-shot multivibrator 104 to detect whether the measuring pulses lag or lead the reference pulses 100, but the one-shot device 120 and the AND gates 122, 124 serve as a means to block any correction output pulse if the phase mismatch is less than an acceptable value within the chosen deadband. The width of the deadband may be determined or changed by selecting or changing the timing interval D of the one-shot device 120.

The operation of the deadband phase matching system of FIG. 10 may be better understood by brief study of FIG. 11 which illustrates corrective action when the slave shaft lags the master shaft. The reference pulses 100 are there shown spaced apart by time periods T, and the delay device 121 thus produces auxiliary pulses 100' shown as delayed by time intervals *D*/2 (e.g., corresponding to 5° of rotation at normal shaft speed). These latter pulses trigger the one-shot device 104, so that the bi-valued control wave 106 and its complement wave 107 appearing on the terminals 104*b* and 104*c* have the shape and timing shown in FIG. 9.

By choosing the angular mounting position of the stationary core 96 and coil 94, the two engine shafts may be arbitrarily designated as matched in phase when the measuring pulses 101 are time coincident and in phase with the auxiliary pulses 100'. The measuring pulses 101*a–c* are shown in FIG. 9 as lagging the corresponding auxiliary pulses by progressively smaller phase angles $\phi 4$, $\phi 5$ and $\phi 6$.

Each reference pulse 100 triggers the one-shot device 120, and in response the deadband signal 128 appearing at its output terminal 120*b* thus drops from its normal binary "1" level to a binary "0" level for the short time intervals D. During these intervals the two gates 122 and 124 are both closed and cannot transmit output signals to the driver amplifiers 112, 113 and the motor windings W*i* and W*d*.

The measuring pulse 101*a* shown in FIG. 11 as lagging the previous auxiliary pulse 100' by an angle $\phi 4$ occurs when the control wave 106 is at a binary "1" level, and it thus passes through the gate 110 where it appears as a pulse 115 on gate output terminal 110*c*. The deadband signal 128 at this time has a binary "1" level, so that this output signal 115 passes through the gate 122 where it appears as an output pulse 129 applied to the driver amplifier 112 and the winding W*i*. Thus, the slave engine throttle is adjusted in a speed-increasing direction to correctively advance the phase of the slave output shaft.

Substantially the same operation occurs in response to the second measuring pulse 101*b* shown in FIG. 11 as lagging the previous auxiliary pulse 100' by an angle $\phi 5$. That reference pulse 101*b* passes through the gates 110 and 122 to form a corrective output pulse 129. However, by the time that the phase correction has brought a measuring pulse 101*c* to within a small phase error, then no output pulse can occur. As shown in FIG. 11, the measuring pulse 101*c* lags the previous auxiliary pulse 100' by a very small phase angle $\phi 6$. At the instant when such measuring pulse occurs, the control wave 106 is at a binary "1" level and an output pulse 115 will appear on the terminal 110*c* of the gate 110. Because the one-shot device 120 is now going through a timing cycle, and the deadband signal 128 at terminal 120*b* has a binary "0" value, the gate 122 is closed, and the pulse 115 cannot pass therethrough to the driver amplifier 112 and the winding W*i*. Thus, any of the measuring pulses which appear at time instants within the deadband periods D simply produce no corrective action They cannot cause overcorrection, and continuous hunting is eliminated.

Although FIG. 11 illustrates the operation of the apparatus shown in FIG. 10 when the slave measuring pulses 101 are lagging the auxiliary pulses 100', it will be apparent that if the measuring pulses lead the auxiliary pulses by only a small amount, the same blocking or deadband operation will occur. The delay device 121 centers the deadband about the auxiliary pulses 100' so that no corrective pulses result when the measuring pulses lag or lead by small phase angles. Thus, the present system is one which inhibit corrective action in a digital phase matching system if the phase error is below a predetermined acceptable value, e.g., if the phase error is less than ±5°.

I claim as my invention:

1. In a system for maintaining first and second recurring pulse trains of substantially identical frequency in substantially constant phase relation, the combination comprising means responsive to the pulses of the first train for creating a control signal which has first and second values during approximately the first and second halves of the time period between successive ones of such pulses, means for creating a first output pulse in response to one of said second train pulses occurring while said control signal has its first value, means for creating a second output pulse in response to one of said second train pulses occurring while said control signal has it second value, means for blocking any of said first or second output pulses which occur within a predetermined short deadband interval immediately following the appearance of each pulse in said first train, and means respectively responsive to said first or second output pulses for correctively changing the phase of one of said recurring pulse trains in one sense or the other.

2. The combination set forth in claim 1 further characterized in that said blocking means includes a monostable multivibrator connected to be triggered by pulses of the first train, two normally open gates through which said first and second output pulses may normally pass, said gates being connected to said multivibrator and controlled by the latter and closed during the periods when said multivibrator is in the triggered or set state.

3. In a system for maintaining first ad second recurring pulse trains of substantially identical frequency in substantially constant phase relation, the combination comprising means responsive to each pulse of the first train for producing a bi-valued deadband signal normally having a first value but which has a second value for a time interval equal to a predetermined fraction of the period between successive ones of such pulses, means responsive to said first train of pulses for producing an auxiliary pulse train with each pulse in the latter delayed by approximately one half of said time interval from a corresponding pulse in the first train, means responsive to said auxiliary pulse train for creating a bi-valued control signal which has one value or another value during the first and second approximate halves of the period between each succeeding two pulses in the auxiliary train, means for creating a first output pulse in response to each second pulse which occurs only while (*a*) said control signal has said one value and (*b*) said deadband signal has said first value, means for creating a second output pulse in response to each second pulse which occurs only while (*a*) said control signal has said other value and (*b*) said deadband signal has said first value, and means respectively responsive to said first or second output pulses for collectively changing the phase of one of said recurring pulse trains in one sense or the other.

4. The combination set forth in claim 3 further characterized in that said means for producing said deadband signal is a monostable multivibrator triggered by pulses of said first train, said means for producing said auxiliary pulse train is a time delay device receiving said first pulse train as its input, said means for creating said control signal is a monostable multivibrator triggered by pulses of said auxiliary train, said means for creating said first output pulses include logic circuits receiving said second pulse train as an input and controlled by said control signal and deadband signal, and said means for creating said second output pulses include logic circuits receiving said second pulse train as an input and controlled by said control signal and said deadband signal.

5. The combination set forth in claim 3 further characterized in that the first and second values of said deadband signal are "1" and "0" logic levels; said one and another values of said control signal are respectively "1" and "0" logic levels; said means for creating said first output signal comprises triple input AND logic circuitry connected to receive as inputs (*a*) said second pulse train, (*b*) said control signal and (*c*) said deadband signal and constituting means to pass a second train pulse only when the control signal has a "1" value and the deadband signal has a "1" value; and said means for creating said second output signal comprises triple input AND logic circuitry connected to receive as inputs (*a*) said second pulse train, (*b*) the complement of said control signal, and (*c*) said deadband signal and constituting means to pass a second train pulse only when the control signal complement has a "1" value and the deadband signal has a "1" value.

6. In a system for maintaining first and second shafts, which rotate at substantially the same speed, in phase agreement, the combination comprising means for producing first and second pulses at those instants when said first and second shafts respectively pass through predetermined angular positions, means responsive to said first pulses for producing a deadband signal which normally has a first value but which has a second value for a time interval immediately following each first pulse equal to a predetermined fraction of the period between successive ones of the first pulses, means responsive to said first pulses for producing auxiliary pulses each delayed from the corresponding first pulse by approximately one-half of said time interval, means responsive to said auxiliary pulses for creating a bi-valued control signal which has first and second values respectively during the first and second halves of the time period between successive ones of said delayed pulses, means for creating first output pulses in response to each of said second pulses occurring only while said control signal has its first value and said deadband signal has its first value, means for creating second output pulses in response to each of said second pulses occurring only while said control signal has its second value and said deadband signal has its first value, and means responsive to said first and second output signals for respectively speeding up or slowing down one of said shafts to bring such shafts into phase agreement, there being no output signals and no corrective action so long as the two shafts are not mismatched in phase by a fraction of one revolution which is no greater than one half of said predetermined fraction.

7. The combination set forth in claim 6 further characterized in that said means for producing said deadband signal is a monostable multivibrator connected to be triggered by pulses of said first train.

8. The combination set forth in claim 7 further characterized in that said means for creating said first output pulses and said means for creating said second output pulses each include logic gating means controlled by the output of said monostable multivibrator for blocking the transfer of pulses of the second train during the intervals when that multivibrator is in its set or "1" state.

9. The combination set forth in claim 6 further characterized in that said means for producing said deadband signal is a first monostable multivibrator connected to be triggered by pulses of said first train, said means for producing said control signal is a second monostable vibrator connected to be triggered by said auxiliary pulses, and said two means for producing said first and second output signals are two triple-input AND logic systems receiving pulses of the second train of pulses and controlled by both of said multivibrators.

10. In a system for synchronizing the frequencies of first and second recurring pulse trains, the combination comprising means for producing a special signal in response to pulses of the first and second trains occurring substantially in time coincidence, means responsive to each such special signal for measuring off a time interval $\underline{t1}$ immediately following that signal, means responsive to said first and second pulse trains for producing third and fourth pulse trains corresponding thereto but delayed by periods $\underline{d1}$ which are shorter than the interval $\underline{t1}$, means for creating fifth and sixth pulse trains respectively corresponding to those pulses of the third and fourth trains which occur at times other than during the intervals $\underline{t1}$, a bistate device connected to be set by pulses of said fifth train and reset by pulses of said sixth train, means for creating a first output pulse in response to a pulse of the fifth train occurring while said bistate device is already in its set state, means for creating a second output pulse in response to a pulse of the sixth train occurring while said bistate device is already in its reset state, and means respectively responsive to said first and second output pulses for correctively changing the frequency of one of said recurring pulse trains in one sense or the other, whereby the system consistently produces no frequency-corrective operation when two pulses of the first and second trains substantially coincide in time.

11. The combination set forth in claim 10 further characterized in that said means for producing a special signal is an AND gate connected to receive said first and second pulse trains as inputs, and said means for measuring off a time interval t1 is a monostable multivibrator triggered by said special signal.

References Cited

UNITED STATES PATENTS

| | | | |
|---|---|---|---|
| 2,686,832 | 8/1954 | Fricks | 317—6 X |
| 3,038,104 | 6/1962 | Wessels | 317—6 |

FOREIGN PATENTS

| | | |
|---|---|---|
| 446,394 | 1/1948 | Canada. |

MILTON O. HIRSHFIELD, *Primary Examiner.*

J. A. SILVERMAN, *Assistant Examiner.*